United States Patent [19]
Wolf et al.

[11] Patent Number: 5,593,769
[45] Date of Patent: Jan. 14, 1997

[54] POLYURETHANE PAD COVERING FOR GEL FILLED ARTICLES

[75] Inventors: Robert J. Wolf, Woodbury; Scott M. Purrington, Maplewood; John M. Brandner; David A. Olson, both of St. Paul; John F. Reed, North Oaks, all of Minn.

[73] Assignee: Minnesota Mining And Manufacturing Company, St. Paul, Minn.

[21] Appl. No.: 490,464

[22] Filed: Jun. 14, 1995

[51] Int. Cl.⁶ .................................................. B32B 27/00
[52] U.S. Cl. ........................ 428/286; 428/36.1; 428/903
[58] Field of Search ................................ 428/286, 36.1, 428/903

[56] References Cited

U.S. PATENT DOCUMENTS

| | | | |
|---|---|---|---|
| 3,676,387 | 7/1972 | Lindlof | 260/28.5 B |
| 4,414,970 | 11/1983 | Berry | 128/156 |
| 4,565,736 | 1/1986 | Stein et al. | 428/286 |
| 4,660,228 | 4/1987 | Ogawa et al. | 2/167 |
| 4,777,080 | 10/1988 | Harris, Jr. et al. | 428/212 |
| 5,025,052 | 6/1991 | Crater et al. | 524/104 |

FOREIGN PATENT DOCUMENTS 1268431  3/1972  United Kingdom ............ C08F 43/00

OTHER PUBLICATIONS

Wente, Van A., "Superfine Thermoplastic Fibers", in Industrial Engineering Chemistry, vol. 48, pp. 1342 et seq. (1965).
Report No. 4364, Naval Research Laboratories, publ. May 25, 1964, entitled "Manufacture of Superfine Organic Fibers" by Van A. Wente et al.

*Primary Examiner*—Christopher Raimund
*Attorney, Agent, or Firm*—Gary L. Griswold; Walter N. Kirn; William J. Bond

[57] ABSTRACT

A barrier fabric laminate for use as a cover for a gel filled article is provided. The barrier fabric laminate comprises a fluid impermeable film and a polyurethane nonwoven web which has a friction value of less than 200 g and a fabric hand of less than 200 g. The polyurethane web is formed from fibers of less than about 50 μm diameter on average and is preferably formed with a fluorochemical melt additive by sequentially melt blowing the polyurethane web on a heated collecting drum and laminating in the nip formed by a heated nip roller and the collecting drum.

22 Claims, 1 Drawing Sheet

POLYURETHANE PAD COVERING FOR GEL FILLED ARTICLES

BACKGROUND AND FIELD OF THE INVENTION

This invention relates to the field of elastic or conformable nonwoven fabrics and laminates designed for use in low friction applications.

Gel filled supports are used in a variety of devices where the supports can come into direct contact with a person's skin. The gel is typically a solid tacky viscoelastic material. The solid gel typically contains low molecular weight components that can separate from the gel. As such, generally these gels should be contained in a fluid impermeable barrier layer. This barrier layer should also be soft and conformable and preferably has a very low friction surface, is soil resistant, has high abrasion resistance and adequate tear and puncture resistance. In copending application Ser. No. 08/253,510, filed on Jun. 3, 1994, now abandoned, there is proposed for a gel-filled wrist support, the use of a polyurethane film as a barrier layer. The barrier film covered gel can then further be wrapped in an outer layer for comfortable contact with the person's wrists. For this outer layer there is proposed a polyurethane non-woven, leather, vinyl, "Dacron" or "Ultrilure". These outer layer materials are wrapped around the barrier film gel pad. Although this is advantageous in many respects, there is a considerable need for a barrier outer layer material with greater strength, soil resistance, abrasion resistance, lower friction and ease of use.

Elastomeric polyurethanes have been proposed in other uses which may require skin contact. In U.S. Pat. No. 4,660,228 a glove is formed by two elastic sheet materials that are simultaneously die cut and heat sealed along the periphery to form the glove. One of the glove layers is an elastic polyurethane nonwoven fabric formed by a melt-spinning or melt blowing process. In U.S. Pat. No. 4,777,080 a low abrasion resistant elastic sheet such as a melt blown ethylene vinyl acetate nonwoven is joined to a high abrasion resistant sheet such as a melt blown polyetherurethane nonwoven as the outer layer forming a high abrasion resistant laminate. The higher abrasion resistant sheet laminate is apparently designed for use in apparel applications such as diapers or mattress pads. U.S. Pat. No. 4,565,736 describes a surgical compress with a fibrous polyurethane cover layer and an absorbent layer. U.S. Pat. No. 4,414,970 describes an elastic film, such as a polyurethane film, inner layer covered by two nonwoven fabric layers. U.S. Pat. No. 5,230,701 describes a nonwoven elastomeric web for use in a wound dressing or adhesive bandage. The adhesive bandage backing layer is an elastomeric polyurethane microfiber web.

SUMMARY OF THE INVENTION

The invention is directed to a laminate for use as a barrier layer covering for a gel filled support article or the like. The laminate comprises a microfibrous elastic polyurethane nonwoven web laminated to a fluid impervious film barrier layer. The elastic polyurethane web is preferably joined to the film layer while in an untensioned state in a heated calendering nip such that substantially the entire polyurethane web is partially consolidated and laminated to the film layer. To ensure proper lamination the polyurethane web and the film layer should be heat sealable to each other, however a third heat sealable adhesion layer could also be used.

The elastic polyurethane nonwoven layer is formed of an elastomeric polyurethane which is in the form of a nonwoven elastic web of elastomeric polyurethane fibers. The individual polyurethane fibers have an average fiber diameter of less than about 50 microns, which fibers are preferably formed by a melt blowing process. The basis weight of the nonwoven elastic web is generally about 20 to 1000 g/m$^2$, preferably 70 to 150 g/m$^2$. The fibers of the web prior to calendering are randomly arranged and generally autogeneously bonded. The outer surface of the elastic web following calendering has a friction value of less than 200 g, preferably less than 150 g. The outer surface of the elastic web also has resistance to fiber pilling and is soft to the touch.

The film barrier layer can be any film that is conformable and can be heat sealed to the polyurethane web either directly or by a suitable adhesion or bonding layer. The composite laminate of the film barrier layer and the polyurethane nonwoven web is conformable having a fabric hand of less than 200 g, preferably less than 100 g.

A further aspect of the invention is improvement in soil resistance by use of a fiber treatment to give oil and water repellency. Preferred fiber treatments are fluorochemical compositions that can be applied to the fibers in the form of a spray, immersion bath or the like. A most preferred fluorochemical is a melt additive included in with the polyurethane during extrusion.

The fibrous web and the barrier film of the laminate are preferably substantially continuously bonded by the calendering nip, however, pattern bonding is not excluded. Generally, at least 10% of the surface area of the laminate is bonded by the calendering nip, preferably at least 70%. However, with pattern bonding, the unlaminated area between adjacent laminated areas is at most about 1 cm wide, preferably less than 0.5 cm wide.

The invention also is directed at a method of preparing the above laminate by providing a microfibrous elastic polyurethane nonwoven web into a nip with a barrier film layer and laminating the two under heat and pressure. The nip temperature is sufficient to create a bond between the nonwoven web and the film layer. This is generally at least 100° C. for the preferred polyurethane film layer. On the nonwoven web face the nip roll is generally at least about 60° C., preferably at least at least about 65° C. The nip pressure is preferably about 0.36 kg/cm to 3.57 kg/cm, preferably 0.46 kg/cm to 2.04 kg/cm.

DETAILED DESCRIPTION OF THE PREFERRED EMBODIMENTS

The nonwoven elastic polyurethane webs are preferably formed by a melt blowing process such as that described in Wente, Van A., "Superfine Thermoplastic Fibers", in Industrial Engineering Chemistry, Vol. 48, pages 1342 et seq. (1965) or in Report No. 4364 of the Naval Research Laboratories published May 25, 1964 entitled "Manufacture of Superfine Organic Fibers" by Wente, Van A. et al., except that a drilled die is preferably used. The average fiber diameter of those melt blown fibers is generally less than 25 microns, preferably less than 10 microns. The thermoplastic polyurethane elastomer is extruded from the die 2 as shown in FIG. 1 and preferably forms into a web 3 between the die orifice and the collection surface by autogenious bonding of the fibers.

Figure 1:
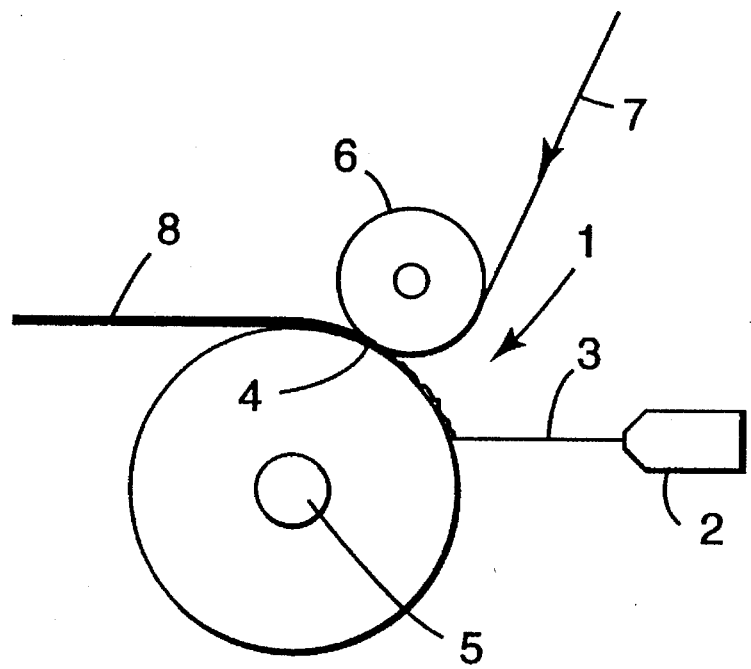
FIG. 1 is a schematic view of the process for forming the invention laminate.

In FIG. 1, a preferred arrangement is shown where the fibrous melt blown web is collected on a smooth drum 5 and on that collection drum subsequently laminated to a barrier film 7 by a nip 4 created by a second heated roller 6. Alternatively, in a second embodiment, the fibrous polyurethane web could be formed in a prior process, collected and then unrolled and brought into contact with a barrier film in a heated nip. In this second embodiment the polyurethane web could be preheated.

The polyurethane nonwoven web is elastic such that when stretched by at least about 25 percent and more it will recover at least 40 percent and preferably at least 60 percent, most preferably at least 85 percent, when the elongation force is removed. The elastic web preferably has an elongation at break of at least about 250 percent, more preferably at least 400 percent. Preferred nonwoven polyurethanes include those disclosed in U.S. Pat. No. 4,777,080, the substance of which is incorporated by reference.

The barrier film to which the polyurethane elastic nonwoven web is laminated is also preferably elastic, as defined above for the elastic nonwoven web. However, the barrier film can be nonelastic (i.e., recover by less than 40 percent when stretched by 25 percent or more) but extensible as long as the laminate is elastic as is defined above and the laminate elongation to break of at least about 100 percent, preferably at least 150 percent.

The barrier film can be any film that can be heat sealed to the polyurethane nonwoven web either directly or by a suitably selected intermediary layer. The barrier film must also provide fluid holdout with respect to the gel or the gel components and also, preferably, prevent liquid migration into the gel. A thermoplastic film is preferred with a polyurethane film being most preferred in terms of its inert behavior to the preferred gels, its elastomeric properties and its heat sealability to the polyurethane nonwoven web. The barrier film is generally about 0.018 to 0.5 mm thick, preferably 0.02 to 0.05 mm. The barrier film can be a single layer film or multi-layer film or a film coated laminate, e.g., to another nonwoven other than the polyurethane nonwoven. In the case of a multi-layer film, the individual layers can be identical or different polymers. The outer layer of a multi-layer film is preferably heat sealable to the polyurethane nonwoven web.

The gel can be any stable viscoelastic material such as the elastomeric block copolymer gels described in U.S. Pat. No. 3,676,387, the substance of which is incorporated herein by reference, or U.K. Patent No. 1,268,431. These gels comprise synthetic block copolymer elastomers tackified by an oil in a ratio of about 4:1 to 15:1 oil to block copolymer. The block copolymers could be Kraton™ or like elastomeric materials which are formed by alternating blocks of a polyalkenyl aromatic, such as polystyrene, and a polyalkadiene such as polyisoprene, polybutadiene or hydrogenated versions thereof.

The polyurethane nonwoven web preferably is treated with a fluorochemical compound to increase oil and water repellency. Preferred fluorochemicals for use as a polymer melt additive are the fluorochemical oxazolidinones, such as those disclosed in U.S. Pat. No. 5,025,052 the substance of which is incorporated herein by reference. The polyurethane can contain from 0.25 to 3.0 weight percent, preferably 0.75 to 1.25 weight percent of a fluorochemical, such as the oxazolidinones, as a melt additive.

The polyurethane nonwoven web is generally joined to the barrier layer in the nip at a temperature of from about 60° C. to 200° C. and a pressure of about 0.36 kg/cm to 3.57 kg/cm. One or both nip rolls can be heated, preferably the roll 5 in contact with the polyurethane nonwoven is smooth and heated to a temperature of from 60° C. to 150° C. when a fluorochemical melt additive is included in the polyurethane fiber. If this roll is a collector roll for the polyurethane as a melt blown web, as in the preferred embodiment shown in FIG. 1, heating the roll provides superior abrasion resistance for the laminate when a fluorochemical melt additive is included in the fiber.

The surface of the nip roll in contact with the polyurethane web is generally both smooth and continuous, however, it can have lands and valleys where pattern bonding is contemplated, however in this case, the lands preferably contact at least 10% of the web.

The roll 6 in contact with the film barrier layer is also preferably smooth such as a steel roll. The temperature in the nip should be such that the polyurethane fibers are not fused into a film so that the web retains its open fibrous structure allowing for a limited amount of heat and/or moisture transport through the fibrous web structure.

Where a heat bonding or adhesive layer is used between the polyurethane nonwoven web and the barrier film layer, this can be a separate film, nonwoven layer or coating. If a film or nonwoven bonding layer is used this would be brought in between the polyurethane nonwoven web and the barrier film layer by conventional means. A coating can be applied by spray coating, knife coating, gravure, Meyer bar or the like as a continuous or intermittent pattern, applied to either the polyurethane nonwoven and/or the barrier film layer.

Figure 2:
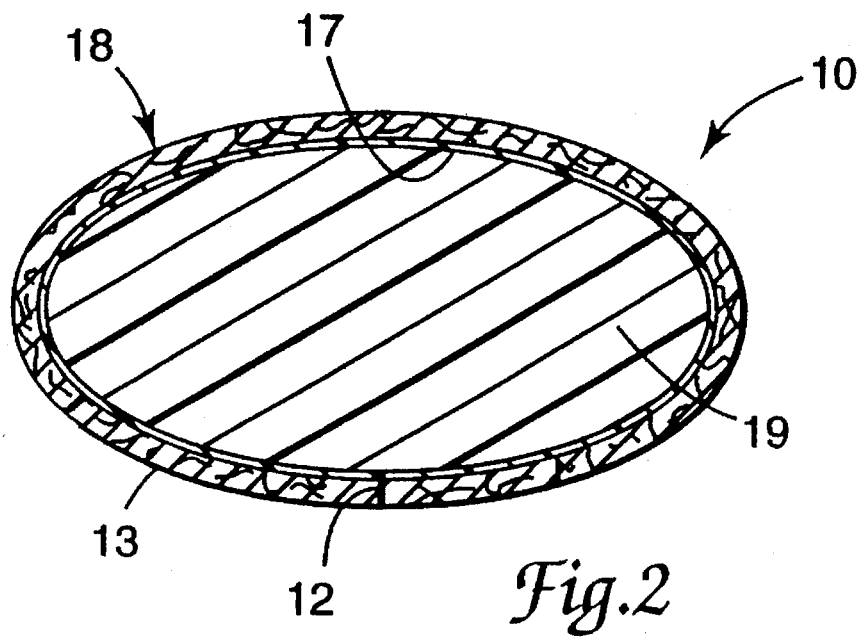
FIG. 2 is a cross-sectional view of a gel filled body using the invention laminate.

The gel filled article can be formed by any conventional means. As shown in FIG. 2 a mass of gel 19 is surrounded by an invention laminate 18 of the outer polyurethane nonwoven web 13 and the film barrier layer 17. This could be formed by creating a elongated tube 10 of the laminate with a longitudinal seam 12 and two end seams (not shown). The tube could surround a previously formed mass of gel or the gel could be injected into the tube at one of the seams prior to the seam being finally sealed. The laminate could also be formed over a rigid base and sealed to the base along a peripheral edge thereof. The base could then be provided with suitable access holes for injection of a gel or the gel previously associated with the base. The gel height over the base is at least 0.3 cm, preferably at least 0.75 cm. The gel filled articles could be used as pads for use in beds, wheel chairs, bike seats, or preferably wrist rests for placement in front of a keyboard or mouse. The pad provides a smooth, comformable surface which supports the wrist and allows the hands to move in a generally circular area with diameter of about 1 cm, preferably at least 3.0 cm, without sliding the wrist and also permits easy movement across the pad by virtue of its low friction value. The pad could be formed into any suitable shape by use of suitably formed laminate in conjunction with rigid supports as needed.

EXAMPLES

Abrasion Resistance

The abrasion resistance of the laminated webs of the invention was evaluated using a Taber Abrasion Tester (available from Taber Industries, North Tonawanda, N.Y.) and a modified test procedure. Test samples were mounted on the standard S-36 Specimen Mounting Card and exposed to 100 wear cycles using CS-0 wheels and a 250 g load. The abrasion resistance of the sample was subjectively evaluated by noting the degree of "pilling" and "roping" of the melt blown (BMF) web as well as the degree of delamination of the BMF web from the polyurethane film.

Fabric Hand

Fabric hand was evaluated using a Model 211-300 Handle-O-Meter (available from Thwing-Albert Instrument Co., Philadelphia, Pa.) following the manufacturer's suggested procedure and a 0.64 cm gap setting. The data is reported as an average of four data points, two in the machine direction and two in the cross machine direction. Hand data for fabrics similar to those used on commercially available wrist rests (e.g., textured vinyl, woven polyester (PET) fabric, and a suede-like fabric) are also reported for comparative purposes.

Friction Value

The "friction value" of the laminated webs of the invention as well as that of unlaminated BMF webs and covering materials similar to those used on competitive wrist rests was evaluated using a IMAAS Slip/Peel Tester (available from Instruments, Inc., Dayton, Ohio). Friction values of the various materials against the rubber coated sled were determined using the test apparatus and procedures described by the equipment manufacturer with the sample holder traversing beneath the sled at a rate of approximately 229 cm/min. The average force in grams was determined for the first two seconds of travel. Fabric samples were tested in both the machine and cross machine directions. Friction values of fabrics similar to those used on commercially available wrist rests (e.g., textured vinyl, woven polyester fabric, and a suede-like fabric) are also reported for comparative purposes.

Tensile Strength

Tensile strengths were determined using test specimens 2.54 cm in width and 8.9 cm in length and a Chatillion Tensile Tester (available from Chatillion, John & Sons, Inc., Greensboro, N.C.) which was operated with a jaw gap of 5.1 cm and a cross-head speed of 25.4 cm/min.

BLOWN MICROFIBER (BMF) WEB PREPARATION

Elastomeric, nonwoven, melt blown microfiber webs were prepared using a thermoplastic elastomeric polyurethane (PS440-200, a polyesterurethane, available from Morton International, Inc., Seabrook, N.H.) using a process similar to that described in Wente, Van A., "Superfine Thermoplastic Fibers" in Industrial and Engineering Chemistry, Vol. 48, pages 1342 et seq. (1965) or in Report No. 4364 of the Naval Research Laboratories, published May 25, 1964 entitles "Manufacture of Superfine Organic Fibers" by Wente, Van. A., Boone, C. D., and Fluharry, E. L. except that the melt blowing die had smooth surface circular orifices 0.38 mm in diameter with an L/D ratio of 6.8 and a spacing of 10 holes per cm. The die temperature was maintained at approximately 225° C.±3° C., the primary air temperature and pressure were 225° C. and 35 KPa respectively and the air knives were positioned with a 0.76 mm gap and a 0.25 mm setback. The extruder was operated at 225° C. and the polymer throughput rate was 134 g/hr/cm die length. The collector drum, which was positioned approximately 12.5–15.2 cm from the die tip, was an oil heated smooth steel drum for allowing temperature control of the collector surface. The collector drum, when not heated by the oil, generally was about 55° C. (unheated) under normal operating conditions. Pigment (#0035067, a custom gray pigment available from ReedSpectrum, Holden, Mass. in pellet form as a concentrate in a polyurethane carrier) was manually blended with PS440-200 resin pellets to achieve a final 6 weight percent pigment level before introducing the pellets into the extruder hopper. Similarly, solid flakes of the fluorochemical melt additive were ground to a powder and manually blended with the hot, dry PS440-200 resin pellets (also including the pigment concentrate pellets) at the indicated levels prior to the pellets being introduced into the extruder hopper.

LAMINATION PROCEDURE

A polyurethane film (Dureflex #PS8010, a 0.025 mm polyesterurethane type film, available from Deerfield Urethane, Chicago, Ill.) was laminated to the rough, air interface surface (i.e., the non-collector surface) of polyurethane BMF webs prepared as described above by means of a heated nip roll positioned approximately 38 cm downstream from the point where microfibers impinged on the collector drum. Lamination pressure was varied by adjusting the gap between the nip roller and the collector drum. The nip roll was also connected to an oil heater to afford elevated temperature control for the lamination process.

Webs A–C

A series of BMF webs were prepared using the general BMF preparation procedure described above except that the fluorochemical (FC) oxazolidinone melt additive similar to those described in U.S. Pat. No. 5,025,052 (Crater et al.) Example 1, except that the alcohol and isocyanate reactants used to prepare the oxazolidinone were $C_8F_{17}SO_2N(CH_3)CH_2CH(CH_2Cl)OH$ and $OCNC_{18}H_{37}$, respectively. The fluorocarbon melt additive level was varied between 0.5 and 1.0 weight percent and the collector temperature was varied as noted in Table 1. The BMF webs had basis weights of 110 g/m²±5 g/m². Abrasion resistance data for these webs is reported in Table 3.

TABLE 1

| | BMF Web Preparation | |
|---|---|---|
| Web | FC (Wt. %) | Collector Temp. (°C.) |
| A | 0.5 | Unheated |
| B | 1.0 | 77 |
| C | 1.0 | 99 |

Examples 1–6

BMF/polyurethane film laminates were prepared using the general BMF web preparation procedure and lamination procedures described above. BMF webs used in the laminates, which had basis weights of 110 g/m²±5 g/m², had fluorochemical oxazolidinone melt additive levels of 0.5 and 1.0 weight percent, as noted in Table 2. Additionally, the collector temperature was varied, as noted in Table 2. Lamination conditions utilized in the preparation of the BMF/polyurethane film laminates are also noted in Table 2. Abrasion resistance, friction value, and hand data for these webs are reported in Table 3. The tensile strength data for an unlaminated sample of a polyesterurethane BMF web without the FC processing aid and the pigment used in the BMF web components of the laminates of the present invention, the polyurethane film used in the laminates of the invention, and the laminate of Example 4 are included in Table 3 for both the machine direction (MD) and cross direction (CD).

TABLE 2

BMF/Polyurethane Film Laminates

| Example # | FC (wt. %) | Collector Temp. (°C.) | Nip Roll Temp. (°C.) | Nip Press. (kg/cm) |
|---|---|---|---|---|
| 1 | 0.5 | Unheated | 116 | 2.09 |
| 2 | 1.0 | Unheated | 110 | 1.86 |
| 3 | 1.0 | Unheated | 116 | 2.09 |
| 4 | 1.0 | 71 | 110 | 0.52 |
| 5 | 1.0 | 77–81 | 99 | 0.23 |
| 6 | 1.0 | 93 | 99 | — |

TABLE 3

Abrasion Resistance Properties

| Web/Example # | Abrasion Resistance | Friction value | Hand | Tensile Strength |
|---|---|---|---|---|
| A | Poor, significant roping of the BMF web | — | — | — |
| B | Good, minor roping of BMF the web | — | — | — |
| C | Good, minor roping of BMF the web | — | — | — |
| 1 | Poor, significant roping of the BMF web | — | — | — |
| 2 | Poor, significant roping of the BMF web | — | — | — |
| 3 | Poor, significant roping of the BMF web | — | — | — |
| 4 | Best, minor roping of the BMF web | 134 g | 65.2 g | 59.85 N-MD 36.67 N-CD |
| 5 | Poor, minor roping but extensive delamination of the BMF web from film | — | — | — |
| 6 | Poor, minor roping but extensive delamination of BMF web from film | — | — | — |
| PET Fabric[1] | — | 175.2 g | 35.5 | — |
| Suede-Like Fabric[2] | — | 233.5 g | 185.5 g | — |
| Vinyl Fabric[3] | — | 117.2 g | >1000 g | — |
| BMF Web[4] | — | — | — | 24.48 N-MD 20.34 N-CD |
| PU Film[5] | — | — | — | 14.02 N-MD 9.75 N-CD |

[1] A woven PET fabric similar to that used for "mouse pad" surfaces.
[2] Suede-like fabric, similar to ULTRASUEDE, a fabric available from Springs Industries, Inc., Fort Mill, SC.
[3] Vinyl coated fabric, available as NAUGAHYDE.
[4] A 110 g/m$^2$ basis weight web produced essentially as described in Example A except that it did not contain the FC processing aid and the gray pigment.
[5] Dureflex PS8010 film used in the preparation of the laminates of the invention.

The data in Tables 1–3 demonstrate that with the PS440-200 polyurethane/fluorochemical oxazolidinone formulation it is necessary to have an elevated collector temperature (greater than 70° C.) to produce BMF webs having good abrasion resistance (i.e., to minimize roping). The data also demonstrate that if a collector temperature less than about 70° C. is used during the production of the BMF web, roping cannot be significantly reduced by utilizing higher nip roll temperatures during the lamination procedure. Additionally, nip roll pressure is a very critical aspect of the lamination procedure, as laminates produced with nip roll pressures significantly less than about 0.52 kg/cm are subject to extensive delamination. Generally speaking, the combination of low friction value and favorable hand provided by the polyurethane BMF/film laminates of the present invention make them more preferred than conventional fabrics as covering materials for wrist rest articles.

The oil and water repellency properties of the laminate of Example 4 were demonstrated using SCOTCHGARD Textile Finishes-SP3010 Oil Test Kit and SCOTCHGARD Textile Finishes - SP3011 Aqueous Test Kit respectively (available from 3M, St. Paul, Minn.) and their associated test procedures. Generally speaking, the oil challenges (1–8) decrease in viscosity with increasing number while the surface tension of the aqueous challenges (1–10) decrease with increasing number as the isopropyl alcohol (IPA) content of the challenge increases from a 90/10 ratio for challenge 1, to a 100 percent IPA content, in 10 percent increments, for challenge 10. Five drops of each of the oil and aqueous challenge fluids were placed on the test specimen and the degree which each drop was absorbed by the BMF web after a period of 60 seconds was noted. None of the test drops of the oil repellency challenges 1–5 were absorbed by the laminate, corresponding to a oil repellency rating of 5 and none of the drops of aqueous challenges 1–10 were absorbed by the laminate, corresponding to an aqueous repellency rating of 10.

Web D and Examples 7–9

A polyurethane BMF web was prepared essentially according to the BMF web preparation process described above except that an elastomeric polyurethane PS 79-200 from Morton International, Inc., was substituted for the PS440-200 resin and the extrusion temperature, the die temperature, the primary air temperature, the primary air pressure, and the collector temperature were adjusted in response to the lower melt temperature of the polyesterurethane resin. The BMF web had basis weights of 110 g/m²±5 g/m² and contained 1 weight percent of the fluorochemical processing additive. Laminates of the BMF Web D to a Dureflex #PS8010 polyurethane film were prepared essentially according to the process described for Examples 1–6 except that the collector temperature was varied while the fluorochemical processing aid concentration and the lamination conditions were held constant. Specific process details for the examples are reported in Table 4 and the abrasion resistance for the samples is reported in Table 5.

TABLE 4

PS79-200 BMF/Film Laminates

| Web/Example # | Collector Temp. (°C.) | Nip Roll Temp. (°C.) | Nip Roll Pressure (kg/cm) |
|---|---|---|---|
| D | Unheated | — | — |
| 7 | 54 | 110 | 1.86 |
| 8 | 63 | 110 | 1.86 |
| 9 | 71 | 110 | 1.86 |

TABLE 5

Abrasion Resistance Properties

| Web/Example # | Abrasion Resistance |
|---|---|
| D | Poor, significant roping of the BMF web |
| 7 | Poor, significant roping of the BMF web and significant delamination |
| 8 | Good, some roping but no delamination |
| 9 | Best, minor roping and no delamination |

The data in Tables 4 and 5 demonstrate that with the PS79-200/fluorochemical oxazolidinone formulation a collector temperature of about 60° C. was needed to achieve good lamination of the BMF web to the polyurethane film. More preferably, the collector temperature should be at least about 70° C. to achieve improved abrasion resistance of the BMF web film laminate. Oil and aqueous repellencies for the laminate of Example 8, which were determined as described for Example 4, were 5 and 10 respectively.

We claim:

1. A gel filled article comprising a viscoelastic gel covered on at least one outer face by a soft conformable barrier fabric, said barrier fabric comprising a calendered elastic laminate of a fluid impermeable film layer and an elastic polyurethane nonwoven fibrous web, wherein the film is positioned facing inward toward the viscoelastic gel such that the nonwoven fibrous web forms an exposed outer surface of the article, and wherein the fibers of the web have an average diameter of less than 50 µm, the exposed outer surface of the polyurethane nonwoven web has a friction value of less than about 200 g and the fabric hand of the barrier fabric is less than about 200 g.

2. The gel filled article of claim 1 wherein the friction value of the polyurethane nonwoven web is less than about 150 g.

3. The gel filled article of claim 1 wherein the fabric hand of the barrier fabric is less than about 100 g.

4. The gel filled article of claim 1 wherein the fluid impermeable film layer is heat sealable.

5. The gel filled article of claim 1 wherein the fluid impermeable film layer and the polyurethane nonwoven fibrous web are directly heat sealed to each other.

6. The gel filled article of claim 1 wherein the calendered laminate is calendered over at least 70% of the laminate surface area.

7. The gel filled article of claim 6 wherein the fluid impermeable film layer is a polyurethane film.

8. The gel filled article of claim 1 wherein the polyurethane nonwoven web is a melt blown web having an average polyurethane fiber diameter of less than 25 µm.

9. The gel filled article of claim 8 wherein the average polyurethane fiber diameter is less than 10 µm.

10. The gel filled article of claim 1 wherein the elastic laminate, when stretched by 25 percent or more, will recover at least 40 percent and the laminate has an elongation at break of at least 100 percent.

11. The gel filled article of claim 10 wherein the elastic laminate, when stretched by 25 percent or more, will recover at least 60 percent.

12. The gel filled article of claim 10 wherein the elastic laminate, when stretched by 25 percent or more, will recover at least 85 percent and the laminate has an elongation at break of at least 150 percent.

13. The gel filled article of claim 8 wherein the polyurethane melt blown nonwoven has a basis weight of from 70 to 150 g/m² and the film thickness is from 0.018 to 0.5 mm.

14. The gel filled article of claim 8 wherein the polyurethane melt blown nonwoven has a fluorochemical treatment to increase oil and water repellency.

15. The gel filled article of claim 14 wherein the fluorochemical compound is a fluorochemical oxazolidinone.

16. The gel filled article of claim 15 wherein the fluorochemical is applied to the surface of the polyurethane nonwoven web.

17. The gel filled article of claim 15 wherein the fluorochemical oxazolidinone is incorporated into the polyurethane fibers as a melt additive.

18. The gel filled article of claim 14 wherein the fluorochemical is incorporated into the polyurethane fibers as a melt additive.

19. The gel filled article of claim 1 wherein the laminate does not delaminate when evaluated using a Taber Abrasion Tester and a modified test procedure involving exposing the sample to 100 wear cycles using CS-0 wheels and a 250 g load.

20. The gel filled article of claim 1 wherein the viscoelastic gel comprises an oil: elastomeric block copolymer mixture in a ratio of 4:1 to 15:1.

21. The gel filled article of claim 2 further comprising a rigid support element defining at least one face of the article.

22. The gel filled article of claim 1 wherein the gel filled article comprises a wrist rest support for a computer keypad or mouse.

* * * * *